June 21, 1932. C. W. DEARING 1,863,968

GRAVEL SPREADER

Filed Oct. 28, 1930

INVENTOR
Clarence W. Dearing
John A. Naismith
ATTORNEY

Patented June 21, 1932

1,863,968

UNITED STATES PATENT OFFICE

CLARENCE W. DEARING, OF WATSONVILLE, CALIFORNIA

GRAVEL SPREADER

Application filed October 28, 1930. Serial No. 491,716.

It is one object of the invention to provide a gravel spreader that may be readily attached to or removed from the discharge end of a dump truck, and one that will automatically maintain itself in an operative position when the truck body is elevated.

It is another object of the invention to provide a spreader of the character indicated that may be used for spreading gravel of all grades, and one that will spread the gravel on the road bed the full width of the truck, or more.

It is still another object of the invention to provide a spreader of the character indicated that can be readily applied to any form of dump truck, and one that will be economical to manufacture, light in weight, strong, durable, and highly efficient in its practical application.

In the embodiment of the invention as herein disclosed, I show at 1 a trough shaped receptacle that is substantially V shaped in transverse cross-section, and preferably somewhat longer than the width of the truck upon which it is to be used, and entirely open at the top 2.

Extending transversely across the top of the trough, and near the ends thereof, are chains as 3, and at 4 are supporting chains provided with hooks as 5 whereby they may be attached to chain 3 in the position desired, and also to some cross member as 6 on the end of truck 7.

In the present instance the bottom of the receptacle is closed by a pair of gates as 8 and 9 mounted on hinges as 10—11 along their upper edges and disposed over openings as 12—13 extending the full length of the trough. Upon each end of each gate is rigidly mounted a lever as at 14—15, the levers swinging in planes parallel with the end of the trough and on opposite sides of an arcuate bar as 16 provided with spaced holes 17. The levers have slots as 18—19 formed therein, and pins as 20—21 are provided to engage the slots 18—19 and the holes 17.

Figure 1:
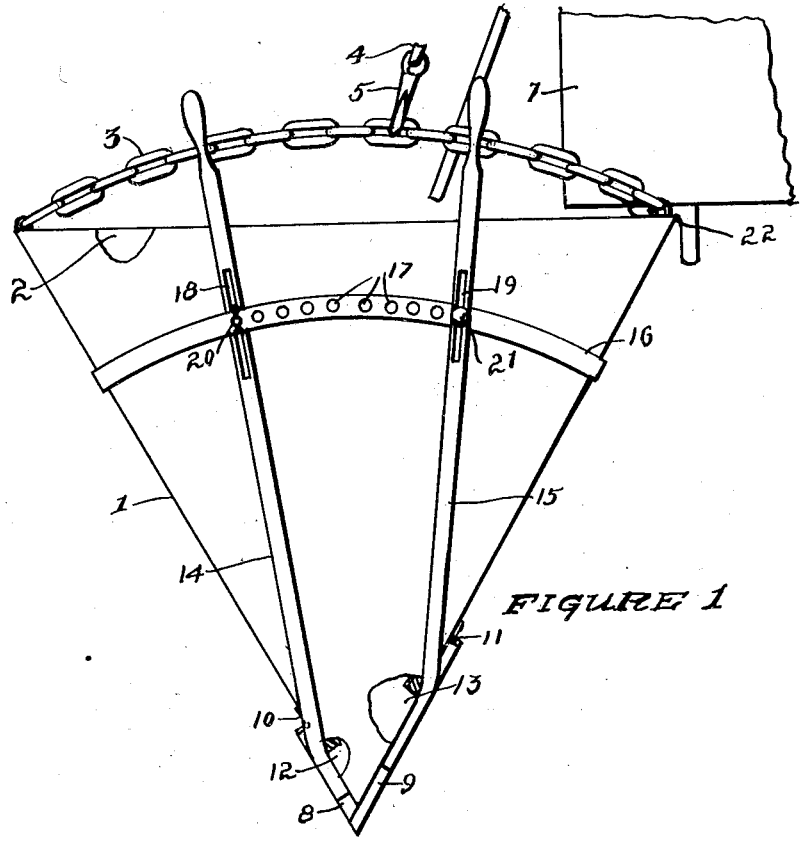
Figure 1 is an end elevation of a device embodying my invention, part broken away.
Figure 2:
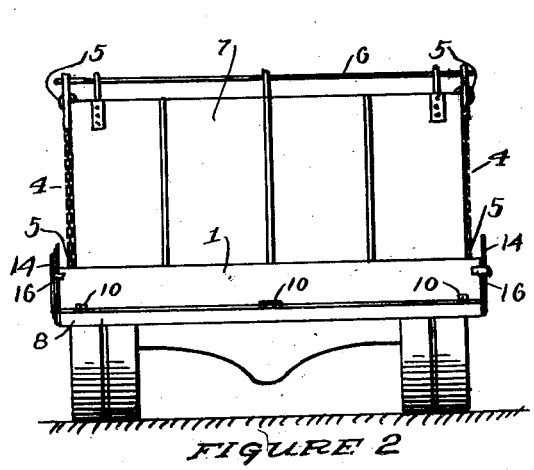
Figure 2 is a rear end elevation of a truck with my improved gravel spreader mounted thereon.
Figure 3:
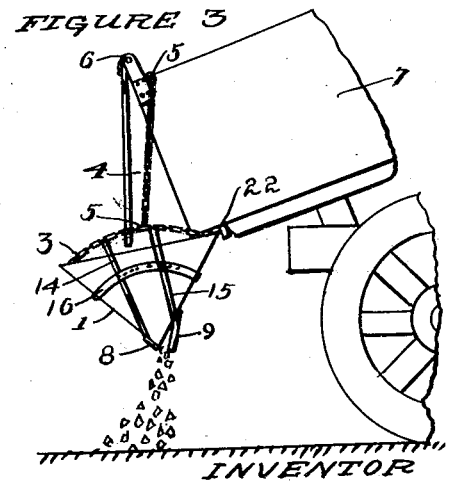
Figure 3 is an illustration of the device in use on a truck.

When the spreader is to be used it is hung upon the truck body as above set forth, with one of the longer edges of the trough engaging and seating against some under portion of the truck body as indicated at 22. If chains 4 were connected to chains 3 at their centers when the body of the truck is tilted, then it is obvious that the top of the trough would lie in a horizontal plane and the trough would naturally swing away from the truck body. This difficulty is overcome by making the chains 4 adjustable with reference to chains 3 so that they may be attached at a desired point between the center of the chain 3 and the edge of the trough swinging under the truck body. By this means, when the truck body is tilted the trough is tilted also, as clearly shown in Figure 3, thereby causing the inner edge of the trough to hug the truck body. The greater the load in the trough, of course, the more closely will it engage the truck body.

By removing a pin 20 or 21 either gate 8 or 9 may be swung open a distance on its hinges, thereby allowing the gravel to discharge upon the road bed below. The gate is locked in its open position by replacing the pin through the slot in the lever and one of the holes 17.

It is important that a device of this kind be rugged and strong, and yet be light and capable of adjustment to permit the feeding of either fine or coarse gravel, or rock up to two inches or more in size. By providing the two sizes of grates, fulcrumed as above described, and provided with lever arms secured as described any required adjustment for any size of material is readily and accurately effected.

Since the weight of the material to be controlled by the gates is great it is desirable that sufficient leverage be had to operate them easily. By mounting the arms 14—15 as integral parts of the gates and extending them upwardly past the upper edge of the trough the desired leverage is secured, but with the leverage obtained in this manner I have found that a single gate does not offer the desired range of adjustments, therefore I have provided the two oppositely disposed gates of different widths disposed as shown whereby every desired adjustment may be secured.

A device of this type is not only economical to manufacture and light in weight, as well as strong, but it is very efficient in actual use because it may be made somewhat longer than the body of the truck is wide since the material flowing into it from the tilted truck body will flow sideways quite a distance, thereby permitting a wide strip of road bed to be gravelled on one trip over it.

It is to be understood, of course, that while I have herein shown and described but one specific embodiment of the invention, changes in form, construction, and method of application and operation, may be made within the scope of the appended claims.

I claim:

1. In combination with a tiltable truck body, a seat carried by the body at the rear thereof, a spreader trough having a part engaged in said seat so as to have pivotal movement relative to the truck, and supporting means for the trough connected to the truck and to the trough at points on the latter between said part thereof and points spaced inwardly from the center of the trough so as to hold the said part of the trough against movement away from the seat, said means including a flexible element connected at its ends to the front and rear sides of the trough at the top portion of the latter and a second flexible element connected to the truck and to the first element.

2. In combination with a tiltable truck body, a spreader trough, a seat carried by the body at the rear thereof, said spreader trough having a part engaged with said seat so as to have pivotal movement relative to the truck and to be held by the seat against movement of the trough forwardly of the truck body, and supporting means for the trough connected to the truck and to the trough at points on the latter between said part and points spaced inwardly from the center of the trough so as to hold the said part of the trough against the seat.

3. The combination with a tiltable truck body, of a spreader trough disposed with one edge underlying the discharge end of the body, abutment means carried by the truck body having detachable engagement with said edge of the trough for holding the trough against movement toward the front of the truck body, and swingable supporting means suspended from the rear upper portion of the body and eccentrically connected to said trough between its center and the edge underlying the truck body whereby to urge the said trough into engagement with said abutment means.

CLARENCE W. DEARING.